(No Model.)
D. L. HOLDEN.
REFRIGERATING APPARATUS.
No. 473,176. Patented Apr. 19, 1892.
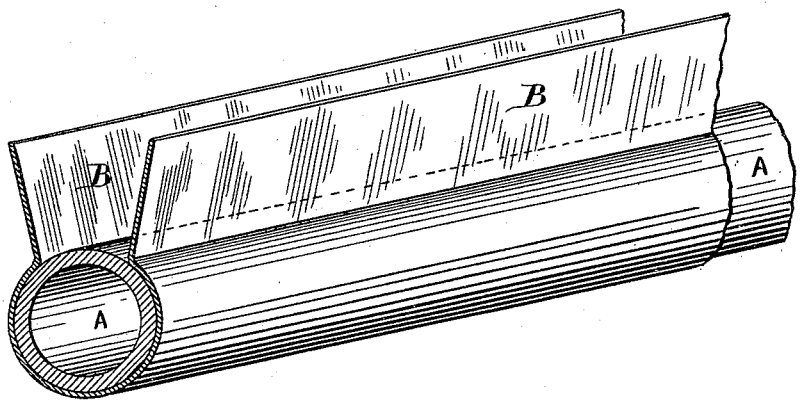
Witnesses
Chas H. Smith
J. Staib
Inventor
Daniel L. Holden.
per Lemuel W. Serrell
Atty

UNITED STATES PATENT OFFICE.

DANIEL L. HOLDEN, OF NEW YORK, N. Y.

REFRIGERATING APPARATUS.

SPECIFICATION forming part of Letters Patent No. 473,176, dated April 19, 1892.

Application filed March 23, 1891. Serial No. 386,001. (No model.)

*To all whom it may concern:*

Be it known that I, DANIEL L. HOLDEN, of the city and State of New York, have invented an Improvement in Refrigerating Apparatus, of which the following is a specification.

In cooling-chambers and refrigerators pipes have been made use of in which brine or similar liquid or other cooling-fluid is caused to circulate, and upon these pipes the moisture from the atmosphere in the cooling-chamber condenses and forms a layer that lessens the cooling action of the pipes on the atmosphere.

My present improvement is to maintain as far as possible the operative character of the cooling-pipes and promote their efficiency in the refrigerating apparatus without any changes in the pipes themselves.

In the drawing I have represented my improvement by a perspective view.

The pipe A is of any desired size or material, and through it is caused to circulate cold brine or ammoniacal vapors or other cooling-fluids. I make use of pieces of sheet metal bent into a partial cylindrical form corresponding to the exterior of the refrigerating-pipes to which they are to be applied, and the end portions of the strips diverge and form the wings B B. Hence these wings can be applied to the refrigerating-pipes at any desired places by simply springing them upon the pipes, and the wings extending outwardly are kept cool by the conductivity of the sheet metal that is in contact with the pipe. The wings can be easily removed for cleaning and replaced. There are no attaching bolts, screws, or rivets, and a large extent of surface is obtained at a very small expense and with but little additional weight to the pipes. Hence the improvement is available with refrigerating apparatus previously constructed without any change in such apparatus and without disconnecting any of the parts in applying the wings to the pipes.

I claim as my invention—

The cooling-wings for refrigerator-pipes, formed of sheet metal with the middle portion bent to conform to and spring around the refrigerating-pipe, the end portions that form the wings projecting outwardly, substantially as specified.

Signed by me this 16th day of March, 1891.

DANIEL L. HOLDEN.

Witnesses:
 GEO. T. PINCKNEY,
 WILLIAM G. MOTT.